（12）United States Patent
Shankar et al.

(10) Patent No.: US 12,518,089 B2
(45) Date of Patent: Jan. 6, 2026

(54) MACHINE LEARNING FOR TRANSLATION TO STRUCTURED COMPUTER READABLE REPRESENTATION

(71) Applicant: SRI International, Menlo Park, CA (US)

(72) Inventors: Natarajan Shankar, Los Altos, CA (US); Stephane Graham-Lengrand, San Mateo, CA (US); Daniel Elenius, Redwood City, CA (US); Chih-hung Yeh, Alameda, CA (US)

(73) Assignee: SRI International, Menlo Park, CA (US)

( * ) Notice: Subject to any disclaimer, the term of this patent is extended or adjusted under 35 U.S.C. 154(b) by 563 days.

(21) Appl. No.: 17/094,278

(22) Filed: Nov. 10, 2020

(65) Prior Publication Data

US 2021/0142005 A1 May 13, 2021

Related U.S. Application Data

(60) Provisional application No. 62/933,650, filed on Nov. 11, 2019.

(51) Int. Cl.
*G06F 40/211* (2020.01)
*G06F 40/253* (2020.01)
(Continued)

(52) U.S. Cl.
CPC .......... *G06F 40/211* (2020.01); *G06F 40/253* (2020.01); *G06F 40/279* (2020.01); *G06N 7/01* (2023.01); *G06N 20/20* (2019.01)

(58) Field of Classification Search
CPC .... G06F 40/211; G06F 40/253; G06F 40/279; G06F 40/42; G06N 7/005; G06N 20/20; G06N 7/01; G06N 5/01; G06N 3/08
See application file for complete search history.

(56) References Cited

U.S. PATENT DOCUMENTS

| 8,423,986 B1 * | 4/2013 | Grechanik | .......... G06F 11/3676 |
| | | | 702/179 |
| 10,210,861 B1 * | 2/2019 | Arel | .................... G10L 15/1815 |

(Continued)

OTHER PUBLICATIONS

Oliveira, C.A., Pardalos, P.M. and Prokopyev, O.A. (2007). Data Structures and Algorithms. In Wiley Encyclopedia of Computer Science and Engineering, B.W. Wah (Ed.), (Year: 2007).*

(Continued)

*Primary Examiner* — Jesse S Pullias
*Assistant Examiner* — Michael C. Lee
(74) *Attorney, Agent, or Firm* — Shumaker & Sieffert, P.A.

(57) ABSTRACT

In general, the disclosure describes techniques for machine learning for translation to structured computer readable representation. An example method to generate a training set for a natural language translation model includes receiving, by a computing system, a grammar comprising rules, one or more of the rules being associated with random biases; generating, by the computing system, at least one of random trees or random graphs based on the random biases in the grammar; for each of the random trees or random graphs, by the computing system, generating a natural language sample; and generating, by the computing system, the training set with the random trees or random graphs and the corresponding natural language samples.

17 Claims, 6 Drawing Sheets

(51) Int. Cl.
  *G06F 40/279* (2020.01)
  *G06N 7/01* (2023.01)
  *G06N 20/20* (2019.01)

(56) References Cited

U.S. PATENT DOCUMENTS

| | | | | |
|---|---|---|---|---|
| 2006/0214948 | A1* | 9/2006 | Murthy | G06F 11/3676 |
| | | | | 714/E11.207 |
| 2014/0172417 | A1* | 6/2014 | Monk, II | G06F 40/30 |
| | | | | 704/9 |
| 2018/0129972 | A1* | 5/2018 | Chen | G06N 3/0454 |
| 2019/0102390 | A1* | 4/2019 | Antunes | G06F 40/295 |
| 2020/0117709 | A1* | 4/2020 | Galitsky | G06F 16/953 |

OTHER PUBLICATIONS

Lu, Wei, et al. "A generative model for parsing natural language to meaning representations." Proceedings of the 2008 Conference on Empirical Methods in Natural Language Processing. 2008. (Year: 2008).*

Lu, Wei, et al. 2009. Natural language generation with tree conditional random fields. In Proc. of the 2009 Conference on Empirical Methods in Natural Language Processing: vol. 1, p. 400-409 (Year: 2009).*

Dušek, Ondřej, and Filip Jurcicek. "Training a natural language generator from unaligned data." Proceedings of the 53rd Annual Meeting of the Association for Computational Linguistics and the 7th International Joint Conference on Natural Language Processing (vol. 1: Long Papers). 2015. (Year: 2015).*

Narayan, Shashi, et al. "Hybrid simplification using deep semantics and machine translation." The 52nd annual meeting of the association for computational linguistics. 2014. Pp. 435-444. (Year: 2014).*

Lei, Tao, et al. "From natural language specifications to program input parsers." Proceedings of the 51st Annual Meeting of the Association for Computational Linguistics (vol. 1: Long Papers). 2013. pp. 1294-1303 (Year: 2013).*

Kuhn, "A Survey and Classification of Controlled Natural Languages," arxiv.org: arXiv: 1507.01701, Jul. 7, 2015, 50 pp.

Sutskever et al., "Sequence to Sequence Learning with Neural Networks," in Proceedings of the 27th International Conference on Neural Information Processing Systems(NIPS'14), Dec. 8-13, 2014, 9 pp.

Bahdanau et al., "Neural Machine Translation by Jointly Learning to Align and Translate," Published as a conference paper at ICLR 2015, May 7-9, 2015, 15 pp.

Ghosh et al., "Arsenal: Automatic Requirements Specification Extraction from Natural Language," arxiv.org: arXiv:1403.3142v3, Apr. 20, 2016, 14 pp.

Vaswani et al., "Attention is all you Need," in Proceedings of 31st Conference on Neural Information Processing Systems (NIPS'17), Dec. 2017, 11 pp.

Shankar, "Deriving Formal Specifications from Natural Language Requirements using Arsenal 2," CPS-VO, High Confidence Software and Systems Conference, Retrieved Feb. 24, 2021 from: https://cps-vo.org/node/60715, May 6, 2019, 2 pp.

Elenius et al., "Deriving Formal Specifications from Natural Language Requirements Using Arsenal 2," SRI International, May 1, 2019, 24 pp.

* cited by examiner

MACHINE LEARNING FOR TRANSLATION TO STRUCTURED COMPUTER READABLE REPRESENTATION

This application claims the benefit of U.S. Provisional Patent Application 62/933,650, filed Nov. 11, 2019, the entire content of which is incorporated herein by reference.

GOVERNMENT RIGHTS

This invention was made with Government support under Contract No. N66001-18-C-4002 awarded by SPAWAR Systems Center Pacific. The Government has certain rights in this invention.

TECHNICAL FIELD

This disclosure generally relates to machine learning.

BACKGROUND

Systems, protocols, procedures, and standards are often used to define a set of requirements to provide for uniform procedures or operability of the subject of the systems, protocols, procedures, and standards. Requirements specification for systems, protocols, procedures, and standards are often writing in unstructured text or semi-structured formats for human consumption (sometime referred to as "natural language"). While natural language is understandable by humans, computer-based tools lack the ability to understand the natural language to facilitate checking for consistency and completeness of the systems, protocols, procedures, and standards.

SUMMARY

In general, the disclosure describes techniques for machine learning for translation to structured computer readable representation. While systems, protocols, procedures, specifications, and standards (collectively referred to herein as "standards documents") are often written in precise natural language for human consumption, ambiguities are inherent to natural language. Standards documents may include, for examples, network specifications (e.g., 5G network specifications), regular expressions and parsers, protocol specifications, health care procedures and diagnostic manuals, contracts, and requests for comments (RFCs), etc. Translating expressions into a structured representation, such as logical statements, facilitates machine reasoning tools, such as validators and safety checks, to be applied to these standards documents. As described herein, a computing system generates a set of training pairs based on a grammar comprising rules associated with random biases. The grammar defines, for a particular application domain, the kind or shape of structured representation that may be computer readable and thus suitable for downstream processing, and the rules of the grammar are equipped with natural expressions. Using the grammar, the computing system generates a large number of random trees or random graphs, where the random biases define the probability of a grammar rule being applied, i.e., the probability of a node appearing in any one of the random trees or random graphs. In some examples, the random trees are concrete syntax trees (CSTs). The natural language expressions are words or phrases that commonly appears in a standards document as to form a basis of a pattern, and are used to convert trees or graphs into natural language statements. Such statements use variable expressions as placeholders for words or phrases that represent domain-specific concepts or entities, rather than contribute to the structure of the statements. In some examples, variable expressions are associated with a type or classification of words or phrases. For example, in the sentence "croissants are offered in more than 80 percent of bakeries," the phrase "are offered in more than" may be a natural language expression and the words and/or phrases "croissants", "80", "bakeries" are examples of phrases that can instantiate various types of variable expressions, namely "item", "integer", and "shop".

The trees or graphs are used to generate the semantic translation of a natural language sentence such that, in operation, a model may construct a tree or graph from a natural language sentence before generating the corresponding semantic construction. Trees or graphs are two-way translatable. A natural language sentence and a semantic construction of the natural language sentence may both be derived from the tree or graph. When a natural language sentence is translated into a tree or graph, an equivalent natural language sentence may be derived from the tree or graph (e.g., the meaning is the same while the form may vary, etc.). The tree or graph and a natural language sentence that is generated from it form a labeled pair. The labeled pairs for the trees or graphs form a training set. Using the training set, the machine learning system trains a model to generate a tree or graph from a natural language sentence. The resulting tree or graph may then be further processed according to rules of a targeted structured representation to generate the symbolic language translation of the input natural language sentence.

The techniques may provide one or more technical advantages that realize at least one practical application. For example, the techniques described herein provide a flexible machine translation tool for translating natural language into a domain specific symbolic language. Additionally, for example, the techniques provide a method to train a model for domain specific machine translation from natural language into symbolic language when there are relatively few examples to generate a training set of labeled pairs. Having a model for domain specific or application specific context trained as described herein may facilitate computer-automated verification of inputs, logic, procedures, protocols, and other language representations that require conformance to standards documents, which can be applied in many different areas, such as networking specifications, health care, systems administration, contracts, and others.

In one example, a method to generate a training set for a natural language translation model includes receiving, by a computing system, a grammar comprising rules, one or more of the rules being associated with random biases; generating, by the computing system, at least one of random trees or random graphs based on the random biases in the grammar; for each of the random trees or random graphs, by the computing system, generating a natural language sample; and generating, by the computing system, the training set with the random trees or random graphs and the corresponding natural language samples.

In one example, a method to translate a natural language statement includes receiving, by a computing system, the natural language statement; applying, by the computing system, a model to the natural language statement to generate a translation tree, the model being trained with a training set comprising training pairs of at least one of random trees or random graphs and corresponding natural language samples, the training pairs generated by: defining a grammar comprising rules associated with random biases, randomly generating the random trees or random graphs using the grammar based on the random biases, and for each of the random trees or random graphs, generating a corresponding natural language sample; and outputting, by the computing system, the translation tree.

In one example, a computer readable storage medium comprises instructions that, when executed, cause a computing system to: receive a natural language statement; apply a model to the natural language statement to generate a translation tree, the model being trained with a training set comprising training pairs of at least one of random trees or random graphs and corresponding natural language samples, the training pairs generated by, the training pairs generated by defining a grammar comprising rules associated with random biases, randomly generating the random trees or random graphs using the grammar based on the random biases, and for each of the random trees or random graphs, generating a corresponding natural language sample; and output the translation tree.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
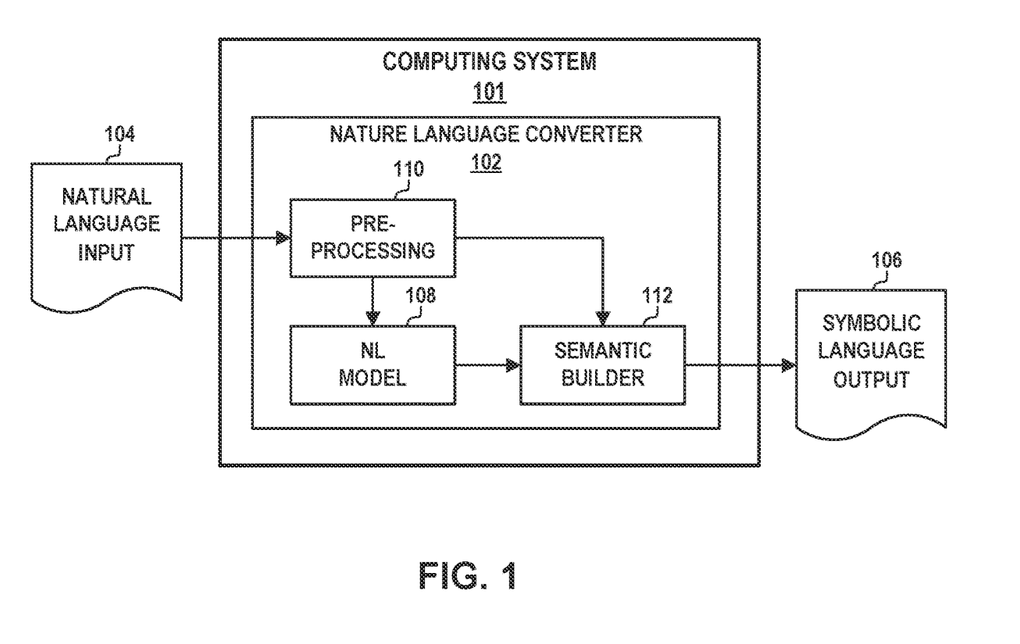
FIG. 1 illustrates an example computing system for natural language processing operating in accordance with the techniques of the disclosure.

FIG. 1 illustrates an example computing system 101 for natural language processing operating in accordance with the techniques of the disclosure. Computing system 101 represents one or more computing devices. Computing system 101 may implement aspects of an ARSENAL system. Computing system 101 may include software, hardware, firmware, or a mixture of hardware, software, and firmware configured for executing a natural language converter 102. Natural language converter 102 parses domain-specific natural language and converts it into a structured representation. Natural language converter 102 uses a model to produce the structured representation in the form of well-formed expression trees written, for example, in a markup language (e.g., XML, JSON, etc.) to facilitate further processing. Natural language converter 102 receives a natural language input 104 (e.g., a sentence from a standards document written in natural language) and outputs a semantic construction of natural language input 104 (sometimes referred to herein as "structured statements") in a symbolic language output 106. For example, natural language input 104 may include:

IF the Monitor Mode is set to INIT and the Monitor Status is set to TRUE; the Monitor Mode shall be set to NORMAL. For example, the symbolic language output 106 of the natural language input 104 may include a markup language version of:

Monitor_Mode=INIT                      A
Monitor_Status→Monitor_Mode'=NORMAL As described herein, natural language converter 102 is configured to output symbolic language output 106 in a domain-specific manner based on grammar designed to capture a relationship between natural language input 104 and the desired form of symbolic language output 106. As described below, this domain-specific grammar is used to generate a training set to train a natural language (NL) model 108 to construct random trees or random graphs. As used herein, random trees and random graphs can refer to randomly generated trees, which are forms of randomly generated graphs. Trees may refer to concrete syntax trees (CSTs), and vice-versa. Natural language converter 102 uses the NL model 108 to generate symbolic language output 106.

In the illustrated example, natural language converter 102 includes a preprocessing unit 110, the natural language (NL) translation model 108 (sometimes referred to as an "NL model"), and a semantic builder 112. The preprocessing unit 110 prepares natural language input 104. Natural language input 104 includes one or more words and/or phrases that have an important part in comprehension of the natural language sentence (sometimes referred to as "operative words"), but do not play an important part of structure of natural language input 104. That is, replacing operative words with a placeholder does not change the structure of natural language input 104. In some examples, preprocessing unit 110 detects those operative words in natural language input 104 and replaces them with internally unique placeholders. Additionally, preprocessing unit 110 generates a substitution mapping of operative word-placeholder pairs. For example, preprocessing unit 110 may convert natural language input 104 of "zero or more repetitions of any character between 'e' and 'h'" into "zero or more repetitions of any character between Character1 and Character2" and generate a substitution mapping of [(Character1, 'e'), (Character2, 'h')] ('e' and 'h' being the operative words).

NL model 108 converts natural language constructs into tree constructs based on a domain-specific grammar. As described below, NL model 108 is trained from a set of labeled examples, which illustrate how basic natural language constructs relate to tree nodes. NL model 108 receives the preprocessed natural language input and outputs a translation tree (e.g., a CST) that maps the preprocessed natural language input to symbolic language output. The translation CST is an intermediary data structure from which the symbolic language output and a reformulated version of the natural language input can both be derived. NL model 108 is trained to construct the translation CST based on a randomly generated labeled pairs using domain-specific grammar (e.g., the domain of the natural language to be translated, etc.) with biases. In some examples, the output of the NL model 108 is a sequential description of a CST, for example the Polish notation of the CST (or the reverse one), where the nodes of the tree are enumerated in a depth-first traversal. For instance, the translation CST may be sequentialized into a list of tree nodes with Polish notation or reverse Polish notation. The translation CST include the placeholders inserted by preprocessing unit 110. Semantic builder 112 traverses the translation CST and replaces the placeholders with the corresponding entities based on the substitution mapping to generate symbolic language output 106. For example, if the natural language input 104 is "zero or more repetitions of any character between 'e' and 'h'", the symbolic language output 106 may be the S-expression "(Plus (CharacterRange 'e' 'h'))".

In an example scenario, natural language input 104 may be, either the string "abc" or the string "cde". The preprocessing unit 110 may generate a JSON structure, for instance:

```
{
  "sentences": [
    {
      "id": "S1",
      "orig-text": "either the string \"abc\" or the string \"cde\"",
      "new-text": "either the string String_1 or the string String_2",
      "substitutions": {
        "String_1": "\"abc\"",
        "String_2": "\"cde\""
      }
    }
  ]
}
```

Based on the output of the preprocessing unit 110, NL model 108 may generate the following translation CST, represented here as a JSON structure:

```
{
  "sentences": [
    {
      "id": "S1",
      "nl": "either the string String_1 or the string String_2",
      "cst": {
        "node": "Or",
        "type": "re",
        "subtrees": [
          {
            "node": "Terminal",
            "type": "re",
            "subtrees": [
              {
                "node": "Specific",
                "type": "terminal",
                "subtrees": [
                  {
                    "node": "\"abc\"",
                    "type": "entity<kstring>",
                    "subtrees": [ ]
                  }
                ]
              }
            ]
          },
          {
            "node": "Terminal",
            "type": "re",
            "subtrees": [
              {
                "node": "Specific",
                "type": "terminal",
                "subtrees": [
                  {
                    "node": "\"cde\"",
                    "type": "entity<kstring>",
                    "subtrees": [ ]
                  }
                ]
              }
            ]
          }
```

-continued

```
        ]
      }
    }
  ]
}
```

Semantic builder 112 traverses the CST with the substitution mapping and may produce a markup language version of the regular expression "(abc|cde)".

Processing circuitry 223 and memory 202 may provide an operating environment or platform for computation engine 221, which may be implemented as software, but may in some examples include any combination of hardware, firmware, and software. Processing circuitry 223 may execute instructions and memory 202 may store instructions and/or data of one or more modules. The combination of processing circuitry 223 and memory 202 may retrieve, store, and/or execute the instructions and/or data of one or more applications, modules, or software. Processing circuitry 223 [122] and memory 202 may also be operably coupled to one or more other software and/or hardware components, including, but not limited to, one or more of the components illustrated in FIG. 2.

Figure 2:
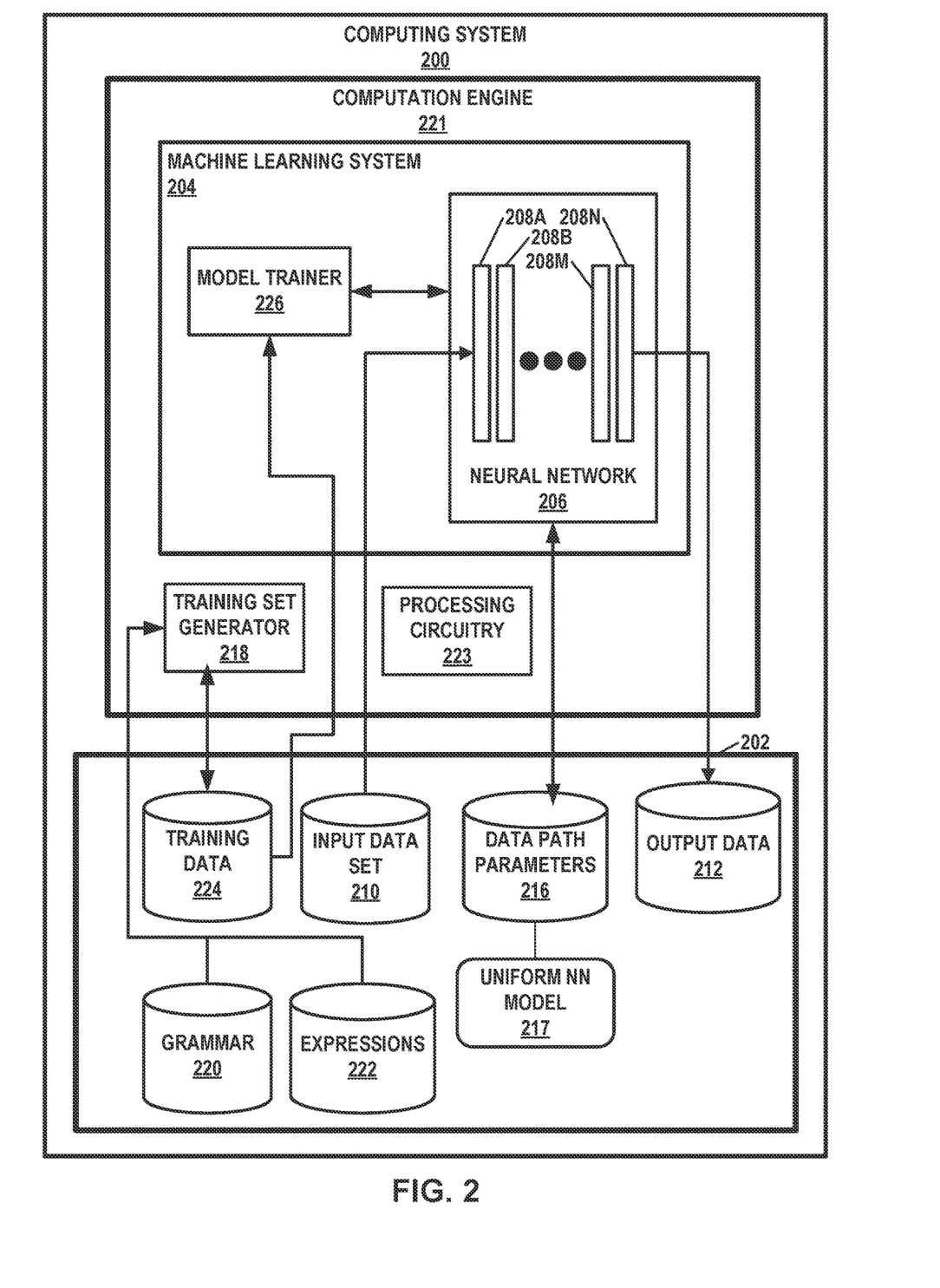
FIG. 2 is a conceptual diagram illustrating an example computing system operating in accordance with the techniques of the disclosure.

Computation engine 221 may perform operations described using software, hardware, firmware, or a mixture of hardware, software, and firmware residing in and/or executing at computing system 200. Computation engine 221 may execute each of the module(s) with multiple processors or multiple devices. Computation engine 221 may execute one or more of such modules as a virtual machine or container executing on underlying hardware. One or more of such modules may execute as one or more services of an operating system or computing platform. One or more of such modules may execute as one or more executable programs at an application layer of a computing platform.

Memory 202 may comprise one or more storage devices. One or more components of computing system 200 (e.g., processors, memory 202, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. The one or more processors of computing system 200 may implement functionality and/or execute instructions associated with computing system 200. Examples of processors include microprocessors, application processors, display controllers, auxiliary processors, one or more sensor hubs, and any other hardware configured to function as a processor, a processing unit, or a processing device. Computing system 200 may use one or more processors to perform operations in accordance with one or more aspects of the present disclosure using software, hardware, firmware, or a mixture of hardware, software, and firmware residing in and/or executing at computing system 200.

Memory 202 may include one or more devices that store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random-access memories (SRAM), and other forms of volatile memories known in the art. Memory 202, in some examples, also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

In the example of FIG. 2, artificial neural network (ANN) 206 receives input data from an input data set 210 and generates output data 212. Input data set 210 may be a set of natural language sentences related to a standard document for which ANN 206 was trained and output data 212 may include CSTs corresponding to the natural language sentences that provide a basis for forming the semantic constructions of the natural language sentences.

ANN 206 may be, for example, a deep neural network (DNN). Each layer 208 of ANN 206 may include a respective set of artificial neurons. In such examples, components 208 include an input layer component 208A, an output layer component 208N, and one or more hidden layers components (e.g., layer components 208B through 208M). In such examples, the layer components may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Data path parameters 216 is a data structure in memory 202 that stores a uniform neural network model 217 for ANN 206 to apply, in inference mode, to input data set 210 to generate output data 212. More specifically, data path parameters 216 store a set of parameters for each of components 208. Parameters may include artificial neuron weights or biases, layer hyperparameters, or another parameter of the uniform neural network model 217. 'Uniform' in this context refers to the single neural network model for neural network 206, generated during training of neural network 206, that can be applied regardless of which components 208 are active/deactivated. For example, machine learning system 204 may use respective sets of parameters of the uniform neural network model 217 for components 208B, 208M.

Training set generator 218 generates training sets of labeled pairs based on grammar 220 and expressions 222 as described herein. The labeled pairs may comprise a CST (e.g., an example output) and a natural language sentence generated based on the CST (e.g., an example input). The training sets of labeled pairs are stored in memory 202 in a training data database 224. Model trainer 226 generates ANN 206 and data path parameters 216 using the training sets of labeled pairs stored in training data database 224. In the illustrated example, ANN 206, training set generator 218, and model trainer 226 are executed on the same computation engine 221. However, in alternative examples, ANN 206, training set generator 218, and/or model trainer 226 may execute on different computation engines 221.

Figure 3:
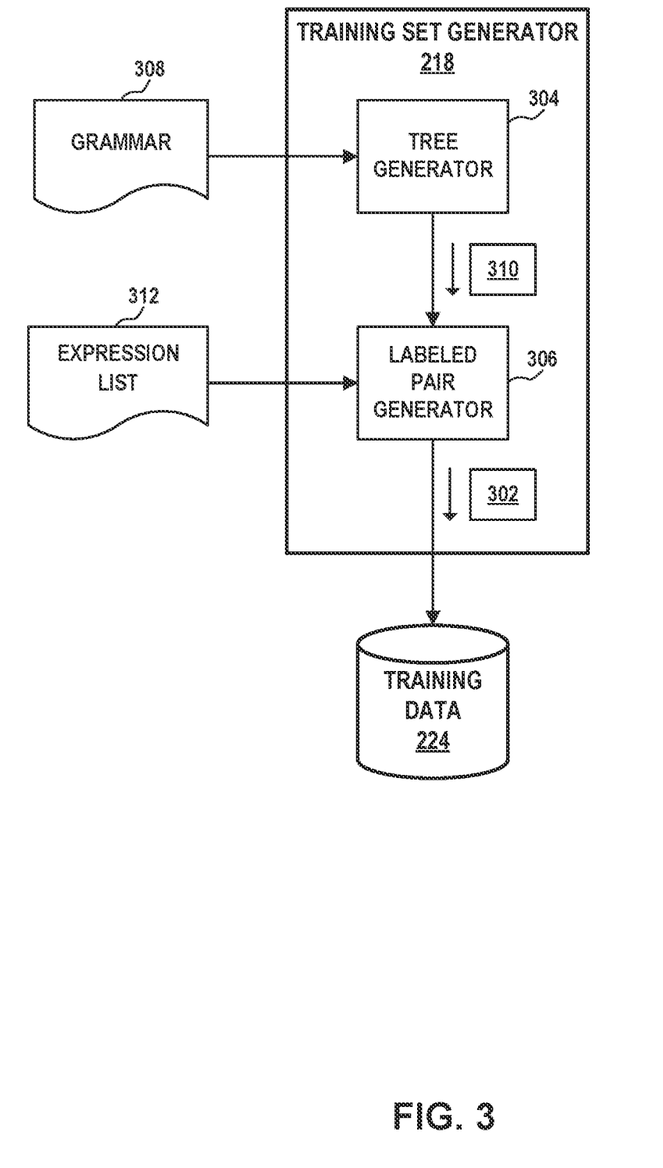
FIG. 3 is a conceptual diagram of a system to generate a training set to train a model for the computing system in accordance with the techniques of the disclosure.

FIG. 3 illustrates an example training set generator 218 to generate labeled pairs 302 to train a natural language model (e.g., NL model 108, ANN 206, etc.) to translate domain-specific natural language into CSTs used to construct symbolic language translations of the natural language. In the illustrated example, training set generator 218 includes tree generator 304 and labeled pair generator 306. Tree generator 304 generates training CSTs 310 based on grammar 308. Grammar 308 defines a structure of the training CST 310 and includes nodes associated with biases. The biases define a probability that a particular node will be included in the training CST 310 being generated. In some examples, biases are defined for the nodes such that probability distribution in a large number of generated training CSTs 310 are biased towards nodes that are more commonly occurring in the specific domain, while including a possibility for nodes that are less common. These nodes also include natural language expressions and variable expressions that are used to generate a natural language sentence based on the training CST 310. The variable expressions are associated with a category of word (e.g., a body part, a medication, a diagnostic term, etc.). Tree generator 304 randomly generates a configurable number of training CSTs 310 (e.g., ten thousand, one hundred thousand, a million, etc.).

Labeled pairs 302 may be, in effect, a recipe for transforming any tree or graph of the grammar into a natural language sentence, and labeled pair generator applied this "recipe" to training CSTs 310. In some examples, labeled pair generator 306 generates labeled pairs 302 each comprising one of the training CSTs 310 and a natural language sentence constructed from the training CST 310. To construct the natural language sentence from the training CST 310, labeled pair generator 306 traverses the training CST 310 and forms the structure of the natural language sentence based on the natural language expressions and the variable expressions. Labeled pair generator 306 then non-deterministically replaces the variable expressions with words and/or phrases on expression list 312 associated with the type of the variable expression to produce a randomly generated natural language sentence for each of the training CSTs 310. Expression list 312 comprises variable expressions pairs with one or more words and or phrases that are substitutable for the corresponding variable expression. For example, if the variable expression is "icecreamType," expression list 312 may contain a list "icecreamType=['vanilla', 'chocolate', 'neopolitan', 'strawberry']". In such an example, labeled pair generator 306 may randomly select "strawberry" when a node in a training CST 310 includes the "icecreamType" variable expression. The labeled pairs 302 constitute the labeled training set with which the model can be trained.

Figure 4A:
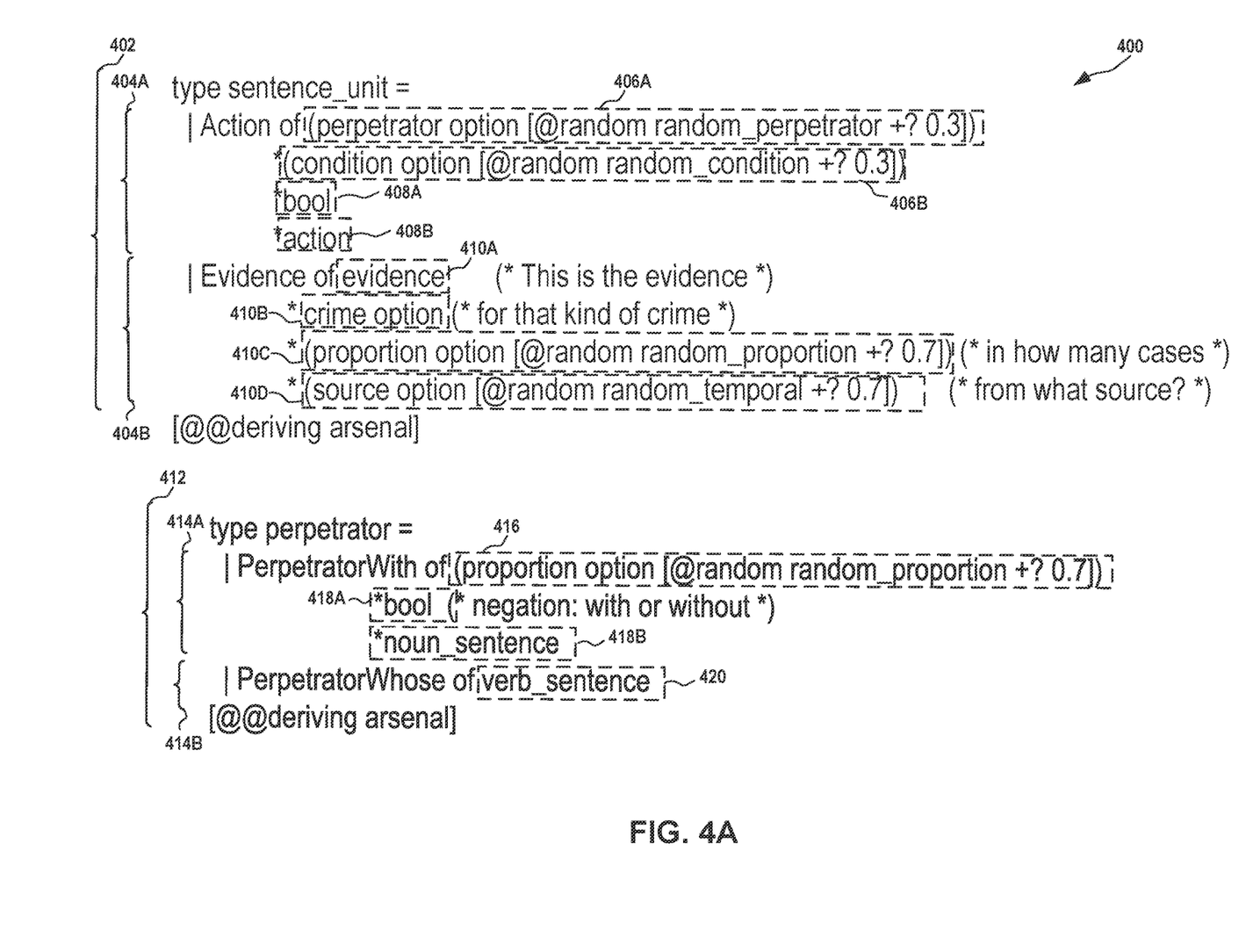
FIG. 4A illustrates a portion of a grammar with random biases for generating random trees or random graphs in accordance with the techniques of the disclosure.

FIG. 4A illustrates an example portion of a grammar 400 (hereinafter, "grammar 400") used to create random trees or random graphs in accordance with the techniques of this disclosure. Grammar 400 may be an example of a portion of grammar 308 of FIG. 3. Grammar 400 defines a structure of the CSTs generated from grammar 400 (e.g., CSTs 310 of FIG. 3). In the illustrated example, grammar 400 includes a set of rules. One or more of the rules are associated with random biases. In this example, the grammar rules are illustrated and described using nodes. Top node structure 402 that defines one or more sub-nodes 404A and 404B (collectively "sub-nodes 404"). Each of sub-nodes 404 defines the structure of the sub-node. In the illustrated example, sub-node 404A includes sub-node definitions 406A and 406B (collectively "sub-node definitions 406") and variable expressions 408A and 408B (collectively "variable expressions 408").

Sub-node definitions 406 define parameters for a sub-node of sub-node 406A. That is, because grammar 400 generates tree structures, sub-nodes from a top node defined by top node structure 402 may further have sub-nodes. In the illustrated example, sub-node definitions 406 include a call to a type of sub-node (e.g., "perpetrator option, "crime option," etc.) and, in some examples, a random bias (e.g., "0.3," "0.7," etc.). When a sub-node definition includes a random bias, the random bias defines a percentage of randomly generates trees that contain that sub-node. For example, a randomly generated tree may have a "perpetrator" sub-node in 30% of the randomly generated trees. The top node structure 402 declares that a tree of type "sentence_unit" is either made of a tree of the form "Action", with (up to) four sub-trees described by 406A, 406B, 408A, 408B, or a tree of the form "Evidence", with (up to) four sub-trees described by sub-trees 410A, 410B, 410C, 410D. The keyword "option" in 406A, 406B, 410B, 410C, 410D indicates that the presence of the corresponding sub-tree is not mandatory. In such cases, a randomness bias, e.g. 0.7 or 0.3, indicates to the CST generator 304 that, in respectively 70% [30%] or 30% of cases, the generator should produce a sub-tree of the corresponding type. In contrast, the absence of keyword "option" in, e.g., 408B or 408C, indicates that those sub-trees must be present in 100% of randomly generated trees.

In the illustrated example, sub-node definition 404B comprising four sub-node definitions 410A-410D (collectively "sub-node definitions 410"). Because sub-node definition 410A does not include a random bias, sub-node definition 410A is always included in a randomly generated tree. In the illustrated example, sub-node definitions 410B and 410C each have a 70% chance of being included in a randomly generated tree.

Sub-node definitions further define the structure of the corresponding sub-node, which may include one or more additional sub-node definitions that add another layer to the randomly generated tree. FIG. 4A illustrates a sub-node 406A. In the illustrated example, sub-node structure 406A includes sub-nodes 414A and 414B. Sub-node 414A comprises a sub-nodes 416, 418A, 418B. Sub-nodes 418A and 418B declare the types of the second and third sub-trees of a tree of type "perpetrator" of the form "PerpetratorWith". In the illustrated example, sub-node definition 416 may cause a randomly generated tree to include a sub-node to sub-nodes 414A (e.g., 70% of the time, etc.). Additionally, sub-node 414A includes a variable expression 420.

Figure 4B:
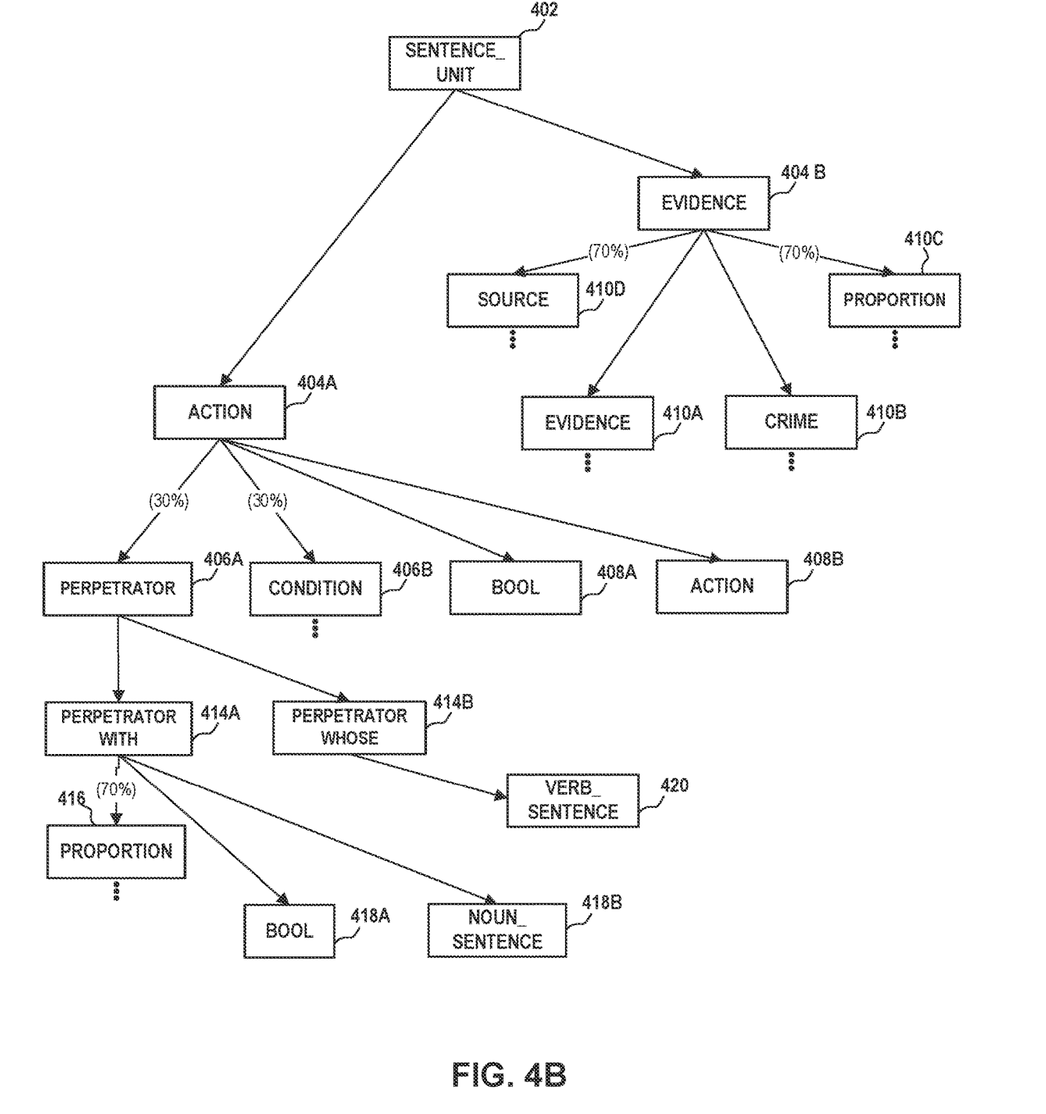
FIG. 4B illustrates a tree representation of a portion of a grammar, in accordance with the techniques of the disclosure.

Grammar 400 is defined to randomly generate trees with varying depths. Grammar 400 is defined for a specific application domain whose standards documents are to be processed such that the trees randomly generated using grammar 400 approximate sentences that are in the target standards document. For exemplary purposes, FIG. 4B illustrates a tree representation of grammar 400 illustrated in FIG. 4A. FIG. 4B illustrates top node 402 (denoting type "sentence_unit") that has sub-nodes 404A and 404B denoting a sentence_unit is either of the form "Actions" OR "Evidence". Below sub-nodes 404A and 404B is a level of AND sub-nodes. Each AND sub-node must be evaluated based on the bias (if any) for inclusion in a randomly generated tree. For example, (i) sub-node 406A is included in 30% of the randomly generated trees, (ii) sub-node 406B is included in 30% of the randomly generated trees, and bool 408A and action 408B are included in all randomly generated trees.

Sub-node 406A (type "Perpetrator") includes sub-nodes 414A and 414B. For a randomly generated tree in which sub-node 414A appears, the tree has a 70% probability of including sub-node 416 ("proportion") and all such trees include sub-nodes 418A and 418B. Sub-node 404B includes (i) sub-node 410A in all of the randomly generated trees, (ii) sub-node 410B in all of the randomly generated trees, (iii) sub-node 410C in 70% of the randomly generated trees, and (iv) sub-node 410D in 70% of the randomly generated trees).

Figure 5:
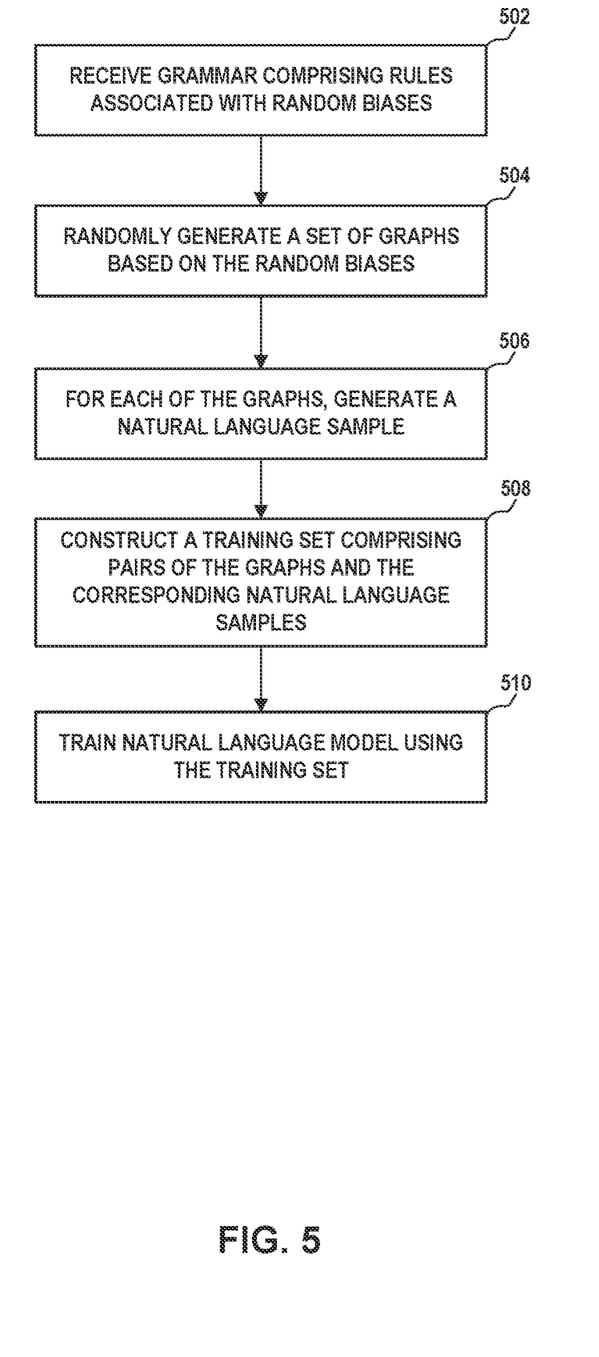
FIG. 5 is a flowchart illustrating an example method to generate domain-specific labeled pairs to train a natural language model, according to techniques described in this disclosure.

FIG. 5 is a flowchart of an example method to generate application domain-specific labeled pairs to train a natural language model, according to techniques described in this disclosure. Initially, training set generator 218 receive a grammar (e.g., grammar 308 of FIG. 3, grammar 400 of FIG. 4, etc.) that includes rules (e.g., node definitions) associated with random biases that specify a probability that a particular rule will be included in a randomly generated tree or graph (e.g. a CST) (502). The grammar may be associated with a standards documents written in natural language that is/are to be converted into symbolic language. Training set generator 218 generates a set of graphs (or trees) based on the grammar with random biases (504). For each randomly generated graph, training set generator 218 generates a natural language sample based on the corresponding graph and expression lists (e.g., expression list 312) to randomly replace variable expressions with relevant language (506). In some cases, training set generator 218 receives natural language expressions. Training set generator 218 generates a training set comprising pairs of the randomly generated graphs and the corresponding natural language sample (508). Training set generator 218 then trains a natural language translation model (e.g., NL model 108) to translate natural language from the particular standards document into graphs to be transformed into symbolic language (510).

Below is an example grammar (e.g., grammar 308 of FIG. 3, grammar 400 of FIG. 4).

```
(***************)
(* Entity kinds *)
type kchar = Char [@@deriving arsenal, show { with_path = false }]
type kstring = String [@@deriving arsenal, show { with_path = false }]
type tchar = kchar Entity! [@@deriving arsenal]
type tstring = kstring Entity! [@@deriving arsenal]
type terminal =
    | Specific of tstring [@weight 10]
    | Empty
    | CharacterRange of tchar*tchar [@weight 4]
    | Word | Any | Digit | Space | NotWord | NotDigit | NotSpace
[@@deriving arsenal]
type re = Terminal of terminal [@weight fun state -> 2. *. depth state ]
    | StartOfLine of re
    | EndOfLine of re
    | Plus of re
    | Star of re
    | Or of re*re
    | Concat of (re list[@random random_list ~min:2 random_re])
```

[@@deriving arsenal] Below are example natural language sentences (e.g., natural language input 104 of FIG. 104) from a standards document to be translated into CSTs by a natural translation model (e.g., NL model 108 of FIG. 1) trained using the example grammar above.
 any character between 'a' and 'b'
 the string "abc"
 line starting with any digit
 either the string "abc" or the string "cde"
 line ending with any digit, followed by any non-digit character
 any character between 'a' and 'b'
 the string "abc", followed by any space character
 zero or more repetitions of any non-word character
Below is an example set of substitution mappings for the example sentences above generated by, for example, pre-processing unit 110.

```
{
  "sentences": [
    {
      "id": "S1",
      "orig-text": "any character between 'a' and 'b'",
      "new-text": "any character between Char_1 and Char_2",
      "substitutions": {
        "Char_1": "'a'",
        "Char_2": "'b'"
      }
    },
    {
      "id": "S2",
      "orig-text": "the string \"abc\"",
      "new-text": "the string String_1",
      "substitutions": {
        "String_1": "\"abc\""
      }
    },
    {
      "id": "S3",
      "orig-text": "line starting with any digit",
      "new-text": "line starting with any digit",
      "substitutions": { }
    },
    {
      "id": "S4",
      "orig-text": "either the string \"abc\" or the string \"cde\"",
      "new-text": "either the string String_1 or the string String_2",
      "substitutions": {
        "String_1": "\"abc\"",
        "String_2": "\"cde\""
      }
    },
    {
      "id": "S5",
      "orig-text": "line ending with any digit, followed by any non-digit character",
      "new-text": "line ending with any digit, followed by any non-digit character",
      "substitutions": { }
    },
    {
      "id": "S6",
      "orig-text": "any character between 'a' and 'b'",
      "new-text": "any character between Char_1 and Char_2",
      "substitutions": {
        "Char_1": "'a'",
        "Char_2": "'b'"
      }
    },
    {
      "id": "S7",
      "orig-text": "the string \"abc\", followed by any space character",
      "new-text": "the string String_1, followed by any space character",
      "substitutions": {
        "String_1": "\"abc\""
      }
    },
    {
      "id": "S8",
      "orig-text": "zero or more repetitions of any non-word character",
      "new-text": "zero or more repetitions of any non-word character",
      "substitutions": { }
    }
  ]
}
```

Below is an example set of CSTs of the example natural language sentences above generated by a natural language translation model (e.g., NL model 108 of FIG. 1) trained with example grammar above.

```
{
  "sentences": [
    {
      "id": "S1",
      "nl": "any character between Char_1 and Char_2",
      "cst": {
        "node": "Terminal",
        "type": "re",
```

```
      "subtrees": [
        {
          "node": "CharacterRange",
          "type": "terminal",
          "subtrees": [
            {
              "node": "'a'",
              "type": "entity<kchar>",
              "subtrees": [ ]
            },
            {
              "node": "'b'",
              "type": "entity<kchar>",
              "subtrees": [ ]
            }
          ]
        }
      ]
    }
  },
  {
    "id": "S2",
    "nl": "the string String_1",
    "cst": {
      "node": "Terminal",
      "type": "re",
      "subtrees": [
        {
          "node": "Specific",
          "type": "terminal",
          "subtrees": [
            {
              "node": "\"abc\"",
              "type": "entity<kstring>",
              "subtrees": [ ]
            }
          ]
        }
      ]
    }
  },
  {
    "id": "S3",
    "nl": "line starting with any digit",
    "cst": {
      "node": "StartOfLine",
      "type": "re",
      "subtrees": [
        {
          "node": "Terminal",
          "type": "re",
          "subtrees": [
            {
              "node": "Digit",
              "type": "terminal",
              "subtrees": [ ]
            }
          ]
        }
      ]
    }
  },
  {
    "id": "S4",
    "nl": "either the string String_1 or the string String_2",
    "cst": {
      "node": "Or",
      "type": "re",
      "subtrees": [
        {
          "node": "Terminal",
          "type": "re",
          "subtrees": [
            {
              "node": "Specific",
              "type": "terminal",
              "subtrees": [
                {
                  "node": "\"abc\"",
```

```
            "type": "entity<kstring>",
            "subtrees": [ ]
          }
         ]
        }
       ]
      },
      {
        "node": "Terminal",
        "type": "re",
        "subtrees": [
          {
            "node": "Specific",
            "type": "terminal",
            "subtrees": [
              {
                "node": "\"cde\"",
                "type": "entity<kstring>",
                "subtrees": [ ]
              }
            ]
          }
        ]
      }
     ]
    }
  },
  {
    "id": "S5",
    "nl": "line ending with any digit, followed by any non-digit character",
    "cst": {
      "node": "EndOfLine",
      "type": "re",
      "subtrees": [
        {
          "node": "Concat",
          "type": "re",
          "subtrees": [
            [
              {
                "node": "Terminal",
                "type": "re",
                "subtrees": [
                  {
                    "node": "Digit",
                    "type": "terminal",
                    "subtrees": [ ]
                  }
                ]
              },
              {
                "node": "Terminal",
                "type": "re",
                "subtrees": [
                  {
                    "node": "NotDigit",
                    "type": "terminal",
                    "subtrees": [ ]
                  }
                ]
              }
            ]
          ]
        }
      ]
    }
  },
  {
    "id": "S6",
    "nl": "any character between Char_1 and Char_2",
    "cst": {
      "node": "Terminal",
      "type": "re",
      "subtrees": [
        {
          "node": "CharacterRange",
          "type": "terminal",
          "subtrees": [
            {
```

-continued

```
          "node": "'a'",
          "type": "entity<kchar>",
          "subtrees": [ ]
        },
        {
          "node": "'b'",
          "type": "entity<kchar>",
          "subtrees": [ ]
        }
      ]
     }
    ]
   }
  },
  {
   "id": "S7",
   "nl": "the string String_1, followed by any space character",
   "cst": {
    "node": "Concat",
    "type": "re",
    "subtrees": [
     [
      {
       "node": "Terminal",
       "type": "re",
       "subtrees": [
        {
         "node": "Specific",
         "type": "terminal",
         "subtrees": [
          {
           "node": "\"abc\"",
           "type": "entity<kstring>",
           "subtrees": [ ]
          }
         ]
        }
       ]
      },
      {
       "node": "Terminal",
       "type": "re",
       "subtrees": [
        {
         "node": "Space",
         "type": "terminal",
         "subtrees": [ ]
        }
       ]
      }
     ]
    ]
   }
  },
  {
   "id": "S8",
   "nl": "zero or more repetitions of any non-word character",
   "cst": {
    "node": "Star",
    "type": "re",
    "subtrees": [
     {
      "node": "Terminal",
      "type": "re",
      "subtrees": [
       {
        "node": "NotWord",
        "type": "terminal",
        "subtrees": [ ]
       }
      ]
     }
    ]
   }
  }
 ]
}
```

Below are reformulations of the example natural language sentence examples above showing the substitute mapping pairs that are generated by the example set of CSTs above. In some examples, the reformulations and the corresponding CST may be added to training sets as labeled pairs when the natural language translation model that generated the set of CSTs is retrained:

a character between Char_1{'a'} and Char_2{'b'} string String_1{"abc"} line beginning with a digit string String_1{"abc"} or string String_2{"cde"} line that ends with a digit, and then a non-digit character a character between Char_1{'a'} and Char_2{'b'} string String_1{"abc"}, and then a space character any number of repetitions of a non-word character.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method of training a machine learning model for a natural language translation, the method comprising:
   receiving, by a computing system, a grammar comprising rules, one or more of the rules being associated with respective random biases, wherein the random biases each specifies a probability that a corresponding node for a corresponding one of the rules will be included when generating at least one of a random tree of a plurality of random trees or at least one of a random graph of a plurality of random graphs;
   generating, by the computing system, at least one of the plurality of random trees or the plurality of random graphs based on the random biases in the grammar;
   for each of the at least one of the plurality of random trees or the plurality of random graphs, by the computing system, generating a corresponding natural language sample;
   generating, by the computing system, a training set comprising training pairs, each of the training pairs comprising one of the at least one of the plurality of random trees or the plurality of random graphs and the corresponding natural language sample; and
   training, by the computing system, the machine learning model using the training set.

2. The method of claim 1, wherein the grammar defines a type of tree or graph to be output by the natural language translation model.

3. The method of claim 1, wherein each of the at least one of the plurality of random trees or the plurality of random graphs defines a structure to translate a natural language sentence into structured data.

4. The method of claim 1, wherein generating the at least one of the plurality of random trees or the plurality of random graphs comprises generating the at least one of the plurality of random trees or the plurality of random graphs based on the rules of the grammar, wherein for each of the rules the corresponding random bias defines a probability a rule outcome is followed and a corresponding node is included in a random tree or random graph.

5. The method of claim 1, wherein each of the rules is associated with multiple natural language renderings, and wherein generating the natural language sample comprises:
   generating a statement based on the at least one of the plurality of random trees or the plurality of random graphs, the statement including variable expressions; and
   randomly replacing each of the variable expressions with the one of the natural language renderings associated with the corresponding rule.

6. The method of claim 1, wherein the at least one of the plurality of random trees or the plurality of random graphs comprise at least one concrete syntax tree.

7. A method of applying a trained machine learning model to translate a natural language statement, the method comprising:
   receiving, by a computing system, the natural language statement;
   applying, by the computing system, the trained machine learning model to the natural language statement to generate a translation tree, the trained machine learning model being trained with a training set comprising training pairs, each of the training pairs comprising one of at least one of a plurality of random trees or a plurality of random graphs and a corresponding natural language sample, wherein each of the at least one of the plurality of random trees or the plurality of random graphs defines a structure to translate a natural language sentence into a structured statement, and wherein the training pairs are generated by:
  defining a grammar comprising rules associated with respective random biases,
  randomly generating the at least one of the plurality of random trees or the plurality of random graphs using the grammar based on the random biases, and
  for each of the at least one of the plurality of random trees or the plurality of random graphs, generating the corresponding natural language sample; and
outputting, by the computing system and based on the training set, the translation tree that maps the natural language statement to a symbolic language output.

8. The method of claim 7, further comprising, before applying the model to the natural language statement:
  detecting operative words in the natural language statement;
  replacing the operative words with placeholders; and
  storing pairs of the operative words and placeholders in a substitution mapping that associates the operative word with the placeholder.

9. The method of claim 8, wherein the translation tree includes placeholder values corresponding to the operative words in the natural language statement, the method further comprising:
  before outputting the translation tree, for each of the placeholders in the translation tree, inserting the corresponding operative word based on the substitution mapping.

10. The method of claim 7, wherein the translation tree is sequentialized into a list of tree nodes.

11. The method of claim 7, further comprising generating a structured statement of the natural language statement based on the translation tree, wherein the structured statement includes placeholder value-operative word pairs.

12. The method of claim 7, wherein the grammar defines a structure of structured statements to be output by the model.

13. The method of claim 7, wherein the random biases specify a probability that a corresponding node for a corresponding one of the rules will be included in one of the at least one of the plurality of random trees or the plurality of random graphs.

14. The method of claim 7, wherein randomly generating at least one of the plurality of random trees or the plurality of random graphs comprises randomly generating the at least one of the plurality of random trees or the plurality of random graphs based on the rules of the grammar, wherein for each of the rules, the corresponding random bias defines a probability that a corresponding node will be included in a random tree or random graph.

15. The method of claim 7, wherein each of the rules is associated with multiple natural language renderings, and wherein generating the natural language sample comprises:
  generating a statement based on the at least one of the plurality of random trees or the plurality of random graphs, the statement including variable expressions; and
  randomly replacing each of the variable expressions with the one of the natural language renderings associated with the corresponding rule.

16. A non-transitory computer readable storage medium for applying a trained machine learning model to translate a natural language statement comprising instructions that, when executed, cause a computing system to:
  receive the natural language statement;
  apply the trained machine learning model to the natural language statement to generate a translation tree, the trained machine learning model being trained with a training set comprising training pairs, each of the training pairs comprising one of at least one of a plurality of random trees or a plurality of random graphs and a corresponding natural language sample, wherein each of the at least one of the plurality of random trees or the plurality of random graphs defines a structure to translate a natural language sentence into a structured statement, and wherein the training pairs are generated by:
    defining a grammar comprising rules associated with respective random biases,
    randomly generating the at least one of the plurality of random trees or the plurality of random graphs using the grammar based on the random biases, and
    for each of the at least one of the plurality of random trees or the plurality of random graphs, generating the corresponding natural language sample; and
  output, based on the training set, the translation tree that maps the natural language statement to a symbolic language output.

17. The computer readable medium of claim 16, wherein the random biases each specifies a probability that a corresponding node for a corresponding one of the rules will be included in one of the at least one of the plurality of random trees or the plurality of random graphs.

* * * * *